(12) United States Patent
Proof

(10) Patent No.: US 10,571,053 B2
(45) Date of Patent: Feb. 25, 2020

(54) LAYERED TUBE FOR A HOSE ASSEMBLY

(71) Applicant: AGC Chemicals Americas, Inc., Exton, PA (US)

(72) Inventor: Joseph David Proof, Terrace, PA (US)

(73) Assignee: AGC CHEMICALS AMERICAS, INC., Exton, PA (US)

( * ) Notice: Subject to any disclaimer, the term of this patent is extended or adjusted under 35 U.S.C. 154(b) by 140 days.

(21) Appl. No.: 14/654,999

(22) PCT Filed: Dec. 26, 2013

(86) PCT No.: PCT/US2013/077876
§ 371 (c)(1),
(2) Date: Jun. 23, 2015

(87) PCT Pub. No.: WO2014/113202
PCT Pub. Date: Jul. 24, 2014

(65) Prior Publication Data
US 2015/0345670 A1    Dec. 3, 2015

Related U.S. Application Data

(60) Provisional application No. 61/746,840, filed on Dec. 28, 2012, provisional application No. 61/822,016, filed on May 10, 2013.

(51) Int. Cl.
*B29C 47/06* (2006.01)
*F16L 11/04* (2006.01)
(Continued)

(52) U.S. Cl.
CPC .............. *F16L 11/04* (2013.01); *B29C 48/21* (2019.02); *B32B 1/08* (2013.01); *B32B 27/08* (2013.01);
(Continued)

(58) Field of Classification Search
CPC ....... C08L 27/18; B32B 1/08; B32B 2270/00; F16L 11/04; F16L 11/08; F16L 11/085;
(Continued)

(56) References Cited

U.S. PATENT DOCUMENTS

| | | | |
|---|---|---|---|
| 4,590,234 A * | 5/1986 | Tasaka | C08K 7/08 524/413 |
| 4,887,647 A | 12/1989 | Igarashi et al. | |

(Continued)

FOREIGN PATENT DOCUMENTS

| | | |
|---|---|---|
| CN | 1282351 A | 1/2001 |
| CN | 1644353 A | 7/2005 |

(Continued)

OTHER PUBLICATIONS

International Search Report for Application No. PCT/US2013/077876 dated Apr. 30, 2014, 3 pages.

(Continued)

*Primary Examiner* — Lee E Sanderson
(74) *Attorney, Agent, or Firm* — Howard & Howard Attorneys PLLC

(57) ABSTRACT

A layered tube for a hose assembly includes an inner layer that defines a chamber for directing a hydraulic fluid. The inner layer comprises a first fluoropolymer in an amount of from about 80 to about 99 parts by weight based on 100 parts by weight of the inner layer. The inner layer also comprises an anti-static additive in an amount of from about 1 to about 20 parts by weight based on 100 parts by weight of the inner layer. The layered tube also includes an outer layer surrounding the inner layer. The outer layer comprises a second fluoropolymer in an amount greater than 50 parts by weight based on 100 parts by weight of the outer layer. The second fluoropolymer may be the same as, or different than, the first fluoropolymer.

14 Claims, 1 Drawing Sheet

(51) Int. Cl.

| | | |
|---|---|---|
| *B29C 48/21* | (2019.01) | |
| *C08L 27/18* | (2006.01) | |
| *B32B 1/08* | (2006.01) | |
| *C08K 5/3492* | (2006.01) | |
| *C08K 3/04* | (2006.01) | |
| *B32B 27/08* | (2006.01) | |
| *B32B 27/20* | (2006.01) | |
| *B32B 27/30* | (2006.01) | |
| *F16L 11/127* | (2006.01) | |
| *B29K 27/18* | (2006.01) | |
| *B29K 105/24* | (2006.01) | |
| *B29K 105/00* | (2006.01) | |
| *B29L 23/00* | (2006.01) | |
| *B29K 27/00* | (2006.01) | |
| *B29C 48/00* | (2019.01) | |
| *B29C 48/151* | (2019.01) | |
| *B29C 48/09* | (2019.01) | |

(52) U.S. Cl.
CPC ............ *B32B 27/20* (2013.01); *B32B 27/304* (2013.01); *C08K 3/04* (2013.01); *C08K 5/34924* (2013.01); *C08L 27/18* (2013.01); *F16L 11/127* (2013.01); *B29C 48/022* (2019.02); *B29C 48/09* (2019.02); *B29C 48/151* (2019.02); *B29K 2027/00* (2013.01); *B29K 2027/18* (2013.01); *B29K 2105/0005* (2013.01); *B29K 2105/0008* (2013.01); *B29K 2105/24* (2013.01); *B29K 2105/246* (2013.01); *B29L 2023/005* (2013.01); *B29L 2023/22* (2013.01); *B32B 2307/21* (2013.01); *B32B 2597/00* (2013.01); *C08L 2205/025* (2013.01)

(58) Field of Classification Search
CPC ........ F16L 11/086; F16L 11/087; F16L 11/10; F16L 11/12; F16L 33/01; B29D 23/001; Y10T 428/139; Y10T 428/1393
USPC ................... 428/36.9, 36.91, 36.92; 138/141
See application file for complete search history.

(56) References Cited

U.S. PATENT DOCUMENTS

| | | | |
|---|---|---|---|
| 5,647,400 A | 7/1997 | Jani et al. | |
| 5,759,329 A * | 6/1998 | Krause | B29C 47/0004 |
| | | | 156/244.13 |
| 5,958,532 A | 9/1999 | Krause et al. | |
| 6,024,133 A | 2/2000 | Kodama et al. | |
| 6,089,277 A | 7/2000 | Kodama et al. | |
| 6,270,901 B1 | 8/2001 | Parsonage et al. | |
| 6,679,297 B1 * | 1/2004 | Nishi | F16L 11/12 |
| | | | 138/137 |
| 6,730,385 B1 | 5/2004 | Tanaka et al. | |
| 6,849,314 B2 | 2/2005 | Jing et al. | |
| 7,205,367 B2 | 4/2007 | Funaki et al. | |
| 7,228,877 B2 | 6/2007 | Shifman | |
| RE40,516 E | 9/2008 | Parsonage et al. | |
| 7,568,505 B2 | 8/2009 | Sakazaki et al. | |
| 8,703,894 B2 | 4/2014 | Duschek et al. | |
| 9,676,716 B2 | 6/2017 | Heuer et al. | |
| 2002/0106470 A1 | 8/2002 | Merziger et al. | |
| 2003/0198771 A1 | 10/2003 | Fukushi et al. | |
| 2004/0187948 A1 | 9/2004 | Shifman | |
| 2004/0247811 A1 * | 12/2004 | DiMascio | B32B 1/08 |
| | | | 428/36.91 |
| 2005/0054777 A1 | 3/2005 | Lee | |
| 2006/0099368 A1 | 5/2006 | Park | |
| 2007/0044906 A1 | 3/2007 | Park | |
| 2007/0190284 A1 | 8/2007 | Park | |
| 2007/0227610 A1 | 10/2007 | Sakazaki | |
| 2007/0259147 A1 | 11/2007 | Boudry et al. | |
| 2008/0207817 A1 | 8/2008 | El Bounia | |
| 2009/0117303 A1 | 5/2009 | Goshiki | |
| 2011/0033647 A1 | 2/2011 | Hsiao et al. | |
| 2012/0073696 A1 | 3/2012 | Terada et al. | |
| 2013/0192676 A1 * | 8/2013 | Gaw | B32B 5/024 |
| | | | 137/1 |
| 2014/0094541 A1 | 4/2014 | Shah et al. | |
| 2014/0246110 A1 | 9/2014 | Sarkar et al. | |
| 2016/0032075 A1 | 2/2016 | Seibold et al. | |

FOREIGN PATENT DOCUMENTS

| | | |
|---|---|---|
| CN | 1692132 A | 11/2005 |
| CN | 101069136 | 11/2007 |
| CN | 101069136 A | 11/2007 |
| CN | 104277674 | 1/2015 |
| CN | 104277674 A | 1/2015 |
| EP | 0728070 A1 | 8/1996 |
| JP | S6116932 A | 1/1986 |
| JP | S 63-284250 A | 11/1988 |
| JP | 05078539 A * | 3/1993 |
| JP | H05177733 A | 7/1993 |
| JP | H05245989 A | 9/1993 |
| JP | 2002254562 A | 9/2002 |
| JP | 2004-075848 A | 3/2004 |
| JP | 2006104237 A | 4/2006 |
| JP | 2007503335 A | 2/2007 |
| JP | 2010185006 A | 8/2010 |
| JP | 2011137156 A | 7/2011 |
| JP | 2012079996 A | 4/2012 |
| WO | 9513186 A1 | 5/1995 |
| WO | 2004011543 A2 | 2/2004 |
| WO | 2009146146 A2 | 12/2009 |
| WO | 2012026549 A1 | 10/2013 |
| WO | 2014113202 A1 | 7/2014 |
| WO | WO 2014/170038 A1 | 10/2014 |
| WO | WO 2014/183101 A1 | 11/2014 |

OTHER PUBLICATIONS

English language abstract for JPS 63-284250 extracted from the PAJ database on Jun. 29, 2015, 1 page.
AGC Chemicals Americas, Inc., "FluonPFA Brochure", Product Information, downloaded from www.agcchem.com on Mar. 19, 2013, pp. 1-4.
AGC Chemicals et al., FluonETFE Ethylene-Tetrafluoroethylene Copolymer, Jul. 2006, 38 pages.
AGC Chemicals Europe, Ltd. et al., "AFLAS Fluroelastomers—AFLAS Technical Brochure", Oct. 2007, pp. 1-20.
SAE Aerospace, "Aerospace Standard—SAE AS5951", Issued Sep. 2004, pp. 1-30.
International Search Report for Application No. PCT/US2016/066905 dated Mar. 24, 2017, 5 pages.
English language abstract and machine-assisted English translation for JP 2004-075848 extracted from espacenet.com database on May 18, 2017, 15 pages.
English language abstract for WO 2014/170038 extracted from espacenet.com database on May 18, 2017, 2 pages.
ANS, "Carbon Nanostructure (CNS) Infusion Presentation", 2011, pp. 1-30.
ANS, "CNS Chopped Fiber", 2014, 2 pages.
ANS, "CNS Encapsulated Flakes", 2014, 2 pages.
Bolger & O'Hearn, Inc., "Advanced FluorineFree Water Repellent", 2016, 2 pages.
Bolger & O'Hearn, Inc., "Technical Data Sheet—Altopel F3", 2016, 4 pages.
Heiq Materials AG et al., "Barrier—High-Performing Durable Repellency Textile Finish", 2016, 15 pages.
Heiq Materials AG et al., "Barrier Water-Repellent", 2016, 2 pages.
International Search Report for Application No. PCT/US2014/037604 dated Sep. 19, 2014, 4 pages.
English language abstract for CN 1282351 extracted from espacenet.com database on Jun. 28, 2018, 1 page.
English language abstract for CN 1644353 extracted from espacenet.com database on Jun. 28, 2018, 1 page.

(56) References Cited

OTHER PUBLICATIONS

English language abstract for CN 1692132 extracted from espacenet.com database on Jun. 28, 2018, 1 page.
English language abstract and machine-assisted English translation for JP 2006-104237 extracted from espacenet.com database on Sep. 17, 20183, 32 pages.
English language abstract and machine-assisted English translation for JP 2010-185006 extracted from PAJ database on Sep. 17, 2018, 6 pages.
English language abstract for JP 2011-137156 extracted from espacenet.com database on Sep. 17, 2018, 1 page.
English language abstract and machine-assisted English translation for JPS 61-16932 extracted from espacenet.com database on May 30, 2018, 6 pages.
English language abstract for JP 2002-254562 extracted from espacenet.com database on May 30, 2018, 1 page.
English language abstract and machine-assisted English translation for JP 2012-079996 extracted from espacenet.com database on May 30, 2018, 21 pages.
English language abstract of "Tetrafluroethylene-Propylene Copolymer Fluororubber", New Chemical Materials, No. 2, Dec. 31, 1978, 1 page, provided by CCPIT Patent & Trademark Law Office on Jan. 3, 2018, and original Chinese language document: "Tetrafluroethylene-Propylene Copolymer Fluororubber", New Chemical Materials, No. 2, Dec. 31, 1978, pp. 9-13.
English language abstract and machine-assisted English translation for JPH 05-177733 extracted from espacenet.com database on Jan. 31, 2018, 7 pages.
English language abstract and machine-assisted English translation for JPH 05-245989 extracted from espacenet.com database on Jan. 31, 2018, 14 pages.
English language abstract for JP 2007-503335 extracted from espacenet.com database on Jan. 31, 2018, 1 page.
English language abstract for WO 2012/026549 extracted from espacenet.com database on Jan. 31, 2018, 1 page.
English language abstract for CN 101069136 extracted from espacenet.com database on November 11, 2019, 1 page (see also English language equivalent U.S. 2009/0117303 previously cited in Information Disclosure Statement filed May 18, 2017).
English language abstract for CN 101069136 extracted from espacenet.com database on Nov. 11, 2019, 1 page (see also English language equivalent U.S. 2009/0117303 previously cited in Information Disclosure Statement filed May 18, 2017).
English language abstract and machine-assisted English translation for CN 104277674 extracted from espacenet.com database on Nov. 11, 2019, 9 pages.

* cited by examiner

US 10,571,053 B2

LAYERED TUBE FOR A HOSE ASSEMBLY

RELATED APPLICATIONS

This application is the National Stage of International Patent Application No. PCT/US2013/077876, filed on Dec. 26, 2013, which claims priority to and all the advantages of U.S. Provisional Patent Application Nos. 61/746,840, filed on Dec. 28, 2012 and 61/822,016, filed on May 10, 2013, the content of which is incorporated herein by reference.

FIELD OF THE INVENTION

The present invention generally relates to a layered tube for a hose assembly.

BACKGROUND

Conventional hose assemblies for the aerospace industry typically include a layered tube and are commonly required to be flexible and able to withstand repeated thermal cycling during continued exposure to aggressive hydraulic fluids (e.g. Skydrol®) and high pressure (e.g. 5,000 psi). Conventional hose assemblies, in particular the layered tube of the conventional hose assemblies, may begin to show visible signs of wear after prolonged exposure to repeated thermal cycling during exposure to the aggressive hydraulic fluids and high pressure (e.g. 5,000 psi). More specifically, conventional hose assemblies may develop white markings or "stress" markings which typically first occur in locations where the conventional hose assembly is flexed or bent. Conventional hose assemblies that have these stress markings may allow a small amount of the hydraulic fluid to migrate or seep (i.e., leak) through the conventional hose assemblies. Dust may collect on the surface of the conventional hose assemblies if hydraulic fluid migrates or seeps through the convention hose assemblies. In the aerospace industry, conventional hose assemblies that experience leakage and/or collect dust on the surface are undesirable. As such, there remains an opportunity to develop an improved hose assembly.

SUMMARY OF THE INVENTION AND ADVANTAGES

The present disclosure provides a layered tube for a hose assembly. The layered tube includes an inner layer that defines a chamber for directing a hydraulic fluid. The inner layer comprises a first fluoropolymer in an amount of from about 80 to about 99 parts by weight based on 100 parts by weight of the inner layer. The inner layer also comprises an anti-static additive in an amount of from about 1 to about 20 parts by weight based on 100 parts by weight of the inner layer. The layered tube also includes an outer layer surrounding the inner layer. The outer layer comprises a second fluoropolymer in an amount greater than 50 parts by weight based on 100 parts by weight of the outer layer. The second fluoropolymer may be the same as, or different than, the first fluoropolymer. The present disclosure also provides a method for forming the layered tube.

The layered tube of this disclosure is both flexible and suitable for use in the aerospace industry. Specifically, the layered tube, when included in the hose assembly, does not show visible signs of wear after repeated thermal cycling during exposure to aggressive hydraulic fluids and high pressure. As such, the layered tube does not leak nor does the layered tube develop "white markings." Without being held to any particular theory, the performance of the layered tube is believed to be achieved through the cooperation of the inner and outer layers and due to the first and second fluoropolymers included in their respective layer.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Figure 1:
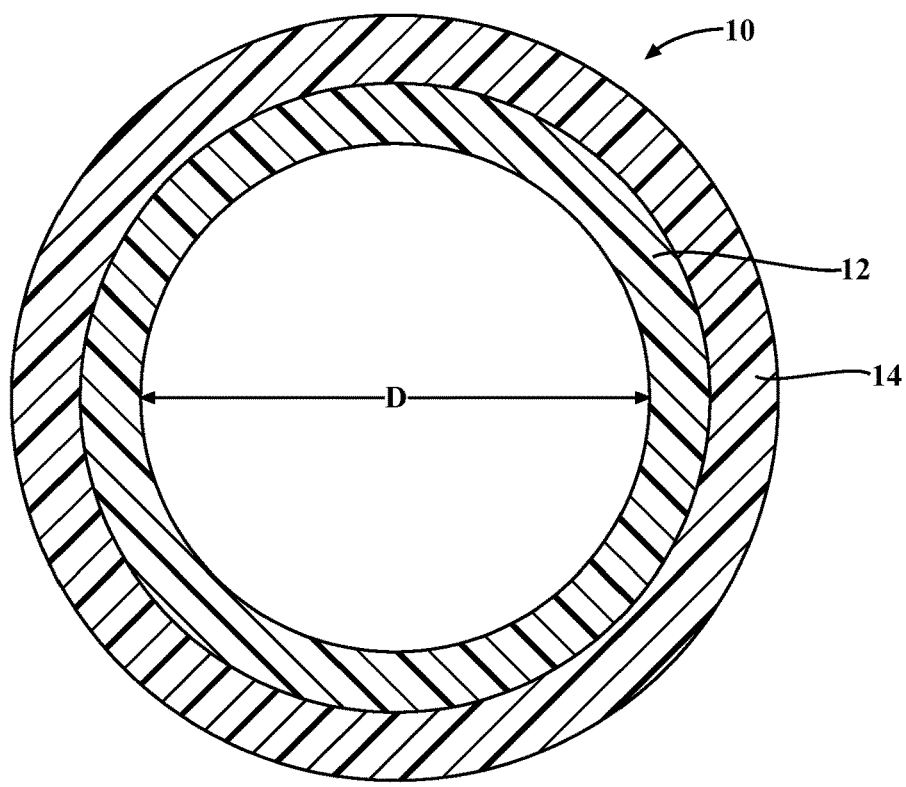
FIG. 1 is a cross sectional view of a layered tube comprising an inner layer and an outer layer.

As shown in FIG. 1, a layered tube 10 for a hose assembly 11 comprises an inner layer 12 and an outer layer 14. The inner layer 12 defines a chamber for directing a hydraulic fluid. Typically, the hydraulic fluid is highly pressurized (e.g. 5,000 psi) and chemically aggressive. An example of such a hydraulic fluid is Skydrol®. The layered tube 10 has an inner diameter D. The inner diameter D is typically from about 0.150 to about 1.100 inches. The inner layer 12 may have a thickness of from about 0.005 to 0.011 inches. The outer layer 14 may have a thickness of from about 0.030 to about 0.080 inches.

Figure 2:
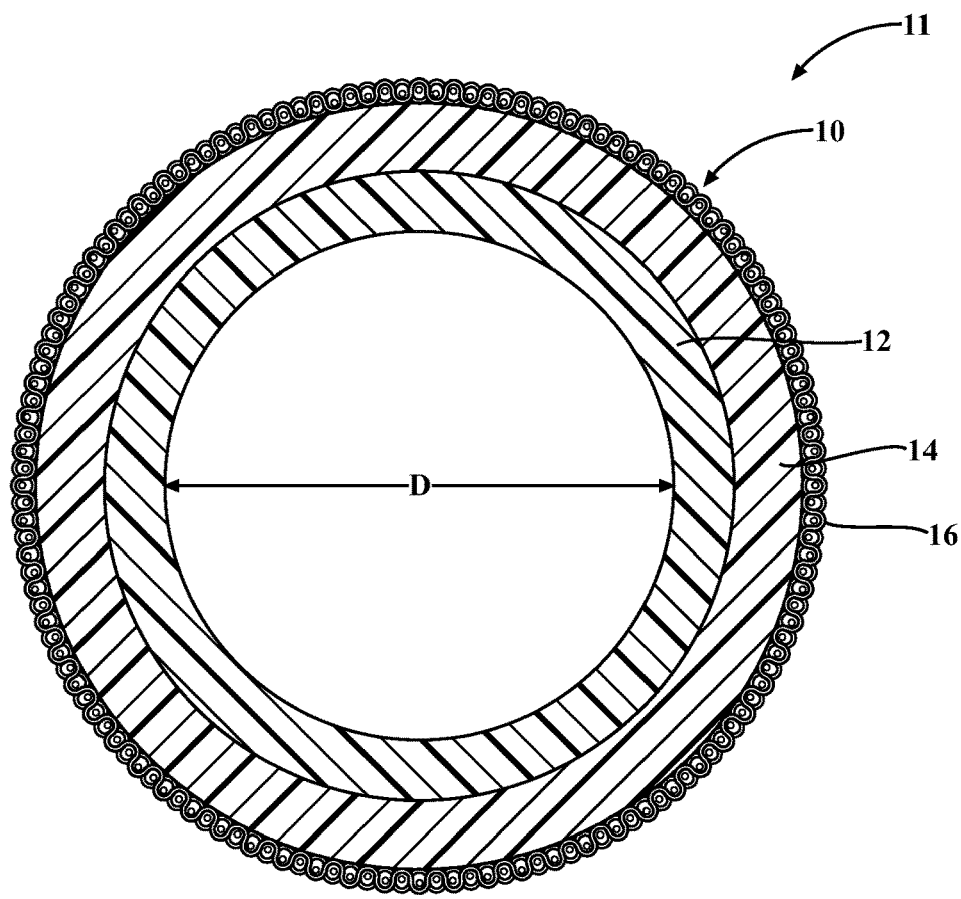
FIG. 2 is a cross sectional view of a hose assembly comprising a braiding layer and the layered tube.

As shown in FIG. 2, when the layered tube 10 is included in the hose assembly 11, a braiding layer 16 may surround the layered tube 10. The braiding layer 16 is typically made of a metal and arranged in a braided orientation for reinforcing the inner and outer layers 12, 14 while enabling flexibility and bending of the hose assembly 11 including the layered tube 10. Although not shown in FIG. 2, the hose assembly 11 may also include other typical components commonly used in conventional hoses assemblies. For example, the hose assembly 11 may include a plurality of connections elements or fittings located at distal ends of the hose assembly 11 for connecting the hose assembly 11 to various systems that the hose assembly 11 is used in.

The inner and outer layers 12, 14 described herein cooperate to establish the performance of the layered tube 10. Specifically, the chemical make-up of the inner and outer layers 12, 14 surprisingly and unexpectedly achieve a cooperative balance that allows the layered tube 10 to be flexible and able to receive the typical components commonly used in conventional hose assemblies, and also be able to transport hydraulic fluids, particularly aggressive and highly pressurized hydraulic fluids, during repeated thermal cycling. As such, the chemical make-up and cooperative nature of the inner and outer layers 12, 14 allows the layered tube 10 to be used in environments where conventional hose assemblies either immediately fail or quickly begin to shows visible signs of failure (e.g. "white marks").

The inner layer 12 comprises a first fluoropolymer in an amount of from about 80 to about 99, from about 82 to about 97, from about 84 to about 95, from about 86 to about 93, or from about 88 to about 91, parts by weight based on 100 parts by weight of the inner layer 12. A fluoropolymer is a polymer that contains multiple instances of bonds between fluorine and carbon. The first fluoropolymer is typically a poly(ethylene-tetrafluoroethylene) (ETFE), a poly(tetrafluoroethylene-co-perfluoroalkoxyethylene) (PFA), or combinations thereof. The ETFE is formed from the reaction product of ethylene and tetrafluoroethylene. The PFA is formed from the reaction product of tetrafluoroethylene and perfluoroalkoxyethylene.

When the first fluoropolymer is the ETFE, various grades of the ETFE may be used. For example, the ETFE may have a melt point of from about 200 to about 260° C. according to Differential Scanning calorimetry (DSC). The ETFE may also have a melt flow rate of from about 5 to about 50, of from about 10 to about 40, of from about 15 to about 30, or of from about 20 to about 25, grams per ten minutes (g/10 min) according to ASTM-53159. The ETFE may also have a tensile strength of from about 35 to about 50 MPa at 23° C. according to ASTM-D638. The ETFE may also have a tensile elongation of from about 360 to about 450 percent at 23° C. according to ASTM-D638. The ETFE may also have a flex modulus of from about 600 to about 900 MPa at 23° C. according to ASTM-D790. Suitable grades of ETFE are commercially available from Asahi Glass Co. Ltd. under the trade name FLUON®, such as FLUON® ETFE and FLUON® LM-ETFE. The ETFE may be provided in any form, such as a pellet, bead, and/or powder.

In other embodiments, the inner layer 12 comprises various grades of the PFA. For example, the PFA may have a melt point of from about 300 to about 320° C. according to DSC. The PFA may also have a melt flow rate of from about 2 to about 30 g/10 min according to ASTM-53159. The PFA may also have a tensile strength of from about 35 to about 50 MPa at 23° C. according to ASTM-D638. The PFA may also have a tensile elongation of from about 320 to about 460 percent at 23° C. according to ASTM-D638. The PFA may also have a flex modulus of from about 80,000 to about 110,000 psi at 23° C. according to ASTM-D790. The PFA may be provided in any form, such as a pellet, bead, and/or powder.

The inner layer 12 also comprises an anti-static additive that is conductive for increasing the conductivity of the inner layer 12. Increasing the conductivity of the inner layer 12 is generally desirable when the inner layer 12 is in contact with a hydraulic fluid which is flammable. More specifically, increasing the conductivity of the inner layer 12 allows the inner layer 12 to dissipate static electricity and prevents hydraulic fluids, which are flammable, from igniting. In one embodiment, the anti-static additive comprises carbon powder. Typically, the carbon powder is obtained from the thermal decomposition of acetylene. Suitable grades of carbon powder are commercially available, for example, from Cabot Corporation under the trade name VULCAN® XC72. The anti-static additive is present in an amount of from about 1 to about 20, from about 5 to about 18, from about 9 to about 16, or about 13, parts by weight, based on 100 parts by weight of the inner layer 12.

The inner layer 12 may also comprise a plurality of additives. The additives may include pigments, leveling/flow aids, fillers, fibers, and the like. The additives may be present in an amount from about 0.1 to about 19, of from about 1 to about 15, from about 3 to about 12, or of from about 6 to about 9 parts by weight, each based on 100 parts by weight of the inner layer 12.

The outer layer 14 comprises a second fluoropolymer, which is the same as, or different than, the first fluoropolymer. The second fluoropolymer is present in an amount greater than 50 parts by weight, based on 100 parts by weight of the outer layer 14. In certain embodiments, the second fluoropolymer is present in an amount of from about 55 to about 100, from about 65 to about 90, from about 75 to about 80, parts by weight based on 100 parts by weight of the outer layer 14.

In certain embodiments, the second fluoropolymer comprises a poly(ethylene-tetrafluoroethylene) (ETFE). In other embodiments, the second fluoropolymer comprises a poly(tetrafluoroethylene-co-perfluoroalkoxyethylene) (PFA). In other embodiments, the second fluoropolymer comprises poly(propylene-co-tetrafluoroethylene) (TFE/P). The TFE/P is formed from the reaction product of tetrafluoroethylene and propylene. As described above, the ETFE is a copolymer formed from the reaction product of tetrafluoroethylene and ethylene, and the PFA is formed from the reaction product of tetrafluoroethylene and perfluoroalkoxyethylene.

The second fluoropolymer may comprise any combination of the ETFE, PFA, and TFE/P. For example, in one embodiment, the second fluoropolymer comprises the ETFE and the TFE/P. In another embodiment, the second fluoropolymer comprises the ETFE and the PFA. In another embodiment, the second fluoropolymer comprises the PFA and the TFE/P.

In another embodiment, the second fluoropolymer comprises polyvinylidene difluoride (PVDF). PVDF is the polymerization product of difluoroethylene. In this embodiment, the second fluoropolymer may further comprise the ETFE, the PFA, the TFE/P, or combinations thereof, such that the second fluoropolymer includes PVDF with any combination of ETFE, PFA, and/or TFE/P.

The second fluoropolymer may comprise various grades of the ETFE, such as the various grades of ETFE described above, which include the ETFE that is commercially available from Asahi Glass Co. Ltd. under the trade name FLUON®, such as FLUON® ETFE and FLUON® LM-ETFE.

In certain embodiments, the second fluoropolymer may also comprise various grades of PFA, such as the various grades described above. The outer layer 14 may comprise from about 50 to about 100, from about 60 to about 96, or from about 80 to about 92 parts by weight of PFA, each based on 100 parts by weight of the outer layer 14.

In certain embodiments, the outer layer 14 may also comprise various grades of TFE/P. For example, TFE/P may have a fluorine content of from about 45 to about 60 parts by weight fluorine based on 100 parts by weight of the TFE/P. The TFE/P may also have a storage modulus of from about 80 to about 550, of from about 150 to about 400, or about 300, each measured with a Rubber Process Analyzer (RPA) at 100° C. and 50 cpm. The TEF/P may also have a glass transition temperature of from about −5 to about 5° C.

In certain embodiments, the second fluoropolymer may comprise the TFE/P in an amount from 0 to about 60, from about 5 to about 55, from about 10 to about 50, from about 15 to about 45, from about 20 to about 40, or from about 30 to about 35, parts by weight, based on 100 parts by weight of the second fluoropolymer. Suitable grades of TFE/P are commercially available from Asahi Glass Company Ltd. under the trade name AFLAS®.

In certain embodiments, the second fluoropolymer comprises the ETFE in an amount of from about 55 to about 95 parts by weight based on 100 parts by weight of the outer layer 14, and the second fluoropolymer also comprises the TFE/P in an amount of from about 5 to about 45 parts by weight based on 100 parts by weight of the outer layer 14.

In another embodiment, the second fluoropolymer consists essentially of the ETFE and the TFE/P. "Consists essentially of", as used herein relative to the second fluoropolymer, allows for the inclusion of other fluoropolymers at a total combined amount of 5 parts by weight or less, based on 100 parts by weight of the second fluoropolymer, provided that the inclusion of the other fluoropolymers do not materially affect the performance of the outer layer 14 of the layered tube 10 to transport a hydraulic fluid, particularly a hydraulic fluid under high pressure, while maintaining flexibility.

Although not required, the outer layer 14 may also comprise a crosslinker. The outer layer 14 may comprise the crosslinker in an unreacted form. Alternatively, the outer layer 14 may comprise the reaction product of the crosslinker and the second fluoropolymer. In embodiments where the outer layer 14 comprises the unreacted crosslinker, it is to be appreciated that the crosslinker may still be capable of reacting if exposed to sufficient conditions, such as high heat or other sources of energy. For example, in one embodiment, the outer layer 14 comprises the second fluoropolymer and the unreacted crosslinker, and after some period of time (e.g. 7 days), the outer layer 14 is exposed to an electron beam. After exposure to the electron beam, the outer layer 14 comprises the reaction product of the second fluoropolymer and the crosslinker (i.e., the crosslinker has reacted with the second fluoropolymer such that the outer layer 14 no longer comprises the unreacted crosslinker).

Typically, the crosslinker is a triallyl derivative of cyanuric acid. In one embodiment, the triallyl derivative of cyanuric acid is triallyl isocyanurate (TAIC). In another embodiment, the triallyl derivative of cyanuric acid comprises TAIC, triallyl cyanurate (TAC), trimethallyl isocyanurate (TMAIC), or combinations thereof.

In embodiments where the outer layer 14 comprises the crosslinker, the crosslinker may be present in an amount of from about 1 to about 10, from about 2 to about 9, from about 3 to about 8, from about 4 to about 7, or from about 5 to about 6, parts by weight based on 100 parts by weight of the outer layer 14. It is to be appreciated that these values are indicative of the amount of crosslinker actually present in the outer layer 14. If, for example, a portion of the crosslinker is volatilized during the forming of the outer layer 14, a person of skill in the art would be able to adjust the initial amount of crosslinker used to obtain the final amount of the crosslinker actually present. Alternatively, processing conditions could be controlled and/or adjusted to regulate the amount of the crosslinker that volatizes.

In one embodiment, the second fluoropolymer comprises the ETFE in an amount of from about 55 to about 85 parts by weight, the TFE/P in an amount of from about 5 to about 35 parts by weight, and the crosslinker in an amount of from about 1 to about 10 parts by weight, each based on 100 parts by weight of the outer layer 14.

The outer layer 14 may also comprise the plurality of additives. The additives may include pigments, leveling/flow aids, fillers, and fibers. The additives may be present in an amount of from about 0.1 to about 20, of from about 1 to about 15, of from about 3 to about 12, or of from about 6 to about 9 parts by weight, based on 100 parts by weight of the outer layer 14. For example, the additives may comprise a potassium octatitanate fiber for improving the strength of the outer layer 14.

In another embodiment, the outer layer 14 consists essentially of the second fluoropolymer and the crosslinker. "Consists essentially of", as used herein relative to the outer layer 14, allows for the inclusion of other materials at a total combined amount of 5 parts by weight or less, based on 100 parts by weight of the outer layer 14, provided that the inclusion of the other materials do not materially affect the performance of the outer layer 14 of the layered tube 10 to transport a hydraulic fluid, particularly a hydraulic fluid under high pressure, while maintaining flexibility. As a non-limiting example, "consisting essentially of" in this context may allow for the inclusion of flow and leveling aids to facilitate the processing of the layered tube 10, or for pigments to color the layered tube 10. In another embodiment, the outer layer 14 consists essentially of the second fluoropolymer, the crosslinker, and the potassium octatitanate fiber.

In other embodiments, the outer layer 14 comprises the reaction product of the second fluoropolymer and the crosslinker. In these embodiments, the crosslinker reacts with the second fluoropolymer. The reaction product may be produced by subjecting the outer layer 14 containing the unreacted crosslinker, to radiation or other sources of energy sufficient to produce a free radical. It is to be appreciated that although the crosslinker reacts with the second fluoropolymer, the crosslinker may also react with other molecules of the crosslinker. It is to be appreciated that when the reaction product of the crosslinker and the second fluoropolymer is expressed as a series of weight percents pertaining to individual components, that the weight percent of each individual component is the weight percent of the individual component prior to the formation of the reaction product, even though the individual components may have been chemically altered in the reaction to form the reaction product.

The reaction product may be produced by any mechanism capable of creating a free radical, such as applying radiation to the outer layer 14. For example, when the outer layer 14 comprises the crosslinker, the reaction product of the crosslinker and the second fluoropolymer may be formed by subjecting the outer layer 14 to an electron beam. Without being held to any particular theory, an electron beam is beneficial for forming the reaction product because the electron beam creates free radicals and also creates unsaturation in the second fluoropolymer.

In certain embodiments, the outer layer 14 comprises the reaction product of the ETFE in an amount of from about 60 to about 80 parts by weight, the TFE/P in an amount of from about 5 to about 20 parts by weight, and the crosslinker in an amount of from about 1 to about 10 parts by weight, each based on 100 parts by weight of the outer layer 14. Without being held to any particular theory, in regards to the outer layer 14, the ETFE alone is generally considered too stiff to flex which, depending on the chemical composition of the inner layer 12, may make the layered tube 10 unsuitable for applications that require a high degree of flexibility. The inclusion of TFE/P softens the outer layer 14, relative to the ETFE, to allow for flexibility. However, in certain embodiments and dependent on the chemical composition of the inner layer 12, the ETFE and TFE/P alone (i.e., the use of ETFE and TFE/P without the crosslinker), although flexible, is too soft and the layered tube 10 will not sufficiently grip the connection elements while the layered tube 10 is transporting a hydraulic fluid under high pressure. In other words, in these certain embodiments, the use of EFTE and TFE/P alone is not suitable for transporting a hydraulic fluid under high pressure, because the high pressure may loosen the connection elements from the layered tube 10. To this end, the reaction product described in this embodiment achieves a surprising and unexpected balance of properties that provides for a balance of flexibility and stiffness in the layered tube 10, and allows the layered tube 10 to grip the connection elements while the layered tube 10 is transporting a hydraulic fluid under high pressure.

In regards to a method for forming a layered tube 10, having the inner layer 12 and the outer layer 14 surrounding the inner layer 12, the method comprises forming a first mixture comprising from about 80 to about 99 parts by weight of the first fluoropolymer with from about 1 to about 20 parts by weight of the antistatic additive, each based on 100 parts by weight of the first mixture. The method also comprises forming a second mixture comprising from about 50 to about 99 parts by weight of the second fluoropolymer based on 100 parts by weight of the second mixture. The second fluoropolymer is the same as, or different than, the first fluoropolymer. The method may further comprise extruding the first mixture to produce the inner layer 12. The method may further comprise extruding the second mixture to produce the outer layer 14. The method may further comprise co-extruding the first and second mixtures. Although the inner and outer layers 12, 14 are typically formed via extrusion or co-extrusion, the inner and outer layers 12, 14 may be formed by any suitable method.

The method may further comprise the step of compounding the first mixture before the step of extruding the first mixture. The method may further comprise the step of compounding the second mixture before the step of extruding the second mixture. When compounded, the first and second mixtures are typically compounded with a conventional twin screw extruder. The conventional twin screw extruder is typically capable of achieving process temperatures up to 350° C. After compounding, the first and second mixtures are typically cut into pellets. Typically, the size of the pellet is from about 0.05 to about 0.2 inches in length.

The method may further provide that the second mixture comprise the crosslinker in an amount of from about 1 to about 20 parts by weight based on 100 parts by weight of the second mixture.

In certain embodiments, the method comprises the step of applying radiation to the outer layer 14 to cure the outer layer 14. The method may further comprise the step of applying the radiation to the outer layer 14 via an electron beam.

Although not required, in certain embodiments, the inner layer 12 is in direct contact with the outer layer 14, and inner layer 12 and the outer layer 14 are melt bonded together. For example, the inner and outer layers 12, 14 may be in direct contact with each other and melt bonded to each other when the inner layer 12 and outer layer 14 are co-extruded. Having the inner layer 12 and outer layer 14 in direct contact with each other and melt bonded with each other is particularly beneficial when the layered tube 10 is exposed to high pressure. When the inner and outer layers 12, 14 are melt bonded, the inner layer 12 is prevented from "spinning" inside of the outer layer 14, which is another defect associated with conventional hose assemblies that transport hydraulic fluids.

In another embodiment, the layered tube 10 consists essentially of the inner layer 12 and the outer layer 14. In other words, the layered tube 10 includes only the inner and the outer layers 12, 14 (i.e., the layered tube 10 only has two layers).

In one embodiment, the layered tube 10 consists essentially of (A) the inner layer 12, and (B) the outer layer 14 surrounding the inner layer 12. In this embodiment, the inner layer 12 comprises the first fluoropolymer in an amount of from about 80 to about 99 parts by weight based on 100 parts by weight of the inner layer 12, and the anti-static additive in an amount of from about 1 to about 20 parts by weight based on 100 parts by weight of the inner layer 12. Also in this embodiment, the outer layer 14 comprises the second fluoropolymer in an amount greater than 50 parts by weight based on 100 parts by weight of the outer layer 14. In this embodiment, the first fluoropolymer comprises the ETFE, and the second fluoropolymer comprises the ETFE and also comprises the TFE/P.

In another embodiment, the layered tube 10 consists essentially of (A) the inner layer 12, and (B) the outer layer 14 surrounding the inner layer 12. In this embodiment, the inner layer 12 comprises the first fluoropolymer in an amount of from about 80 to about 99 parts by weight based on 100 parts by weight of the inner layer 12, and the anti-static additive in an amount of from about 1 to about 20 parts by weight based on 100 parts by weight of the inner layer 12. Also in this embodiment, the outer layer 14 comprises the second fluoropolymer in an amount greater than 50 parts by weight based on 100 parts by weight of the outer layer 14. In this embodiment, the first fluoropolymer of comprises the ETFE. The second fluoropolymer comprises the ETFE and also comprises the TFE/P. The ETFE of the outer layer 14 is present in an amount of from about 55 to about 95 parts by weight based on 100 parts by weight of the outer layer 14 and the TFE/P is present in an amount of from about 5 to about 45 parts by weight based on 100 parts by weight of the outer layer 14. The outer layer 14 may further comprise a crosslinker in an amount of from about 1 to about 10 parts by weight based on 100 parts by weight of the outer layer 14. When the outer layer 14 comprises the crosslinker, the crosslinker is TAIC. The outer layer 14 may also comprise the reaction product of TAIC and the second fluoropolymer.

In another embodiment, the inner layer 12 of the layered tube 10 comprises from about 90 to about 100, preferably 91, parts by weight of ETFE, and from greater than 0 to about 10, preferably 9, parts by weight of the anti-static additive, each based on 100 parts by weight of the inner layer 12. The ETFE has a melt flow rate of 10 to 20 g/10 min according to ASTM-D3159 and a melting point of 225° C. according to DSC. The anti-static additive is carbon powder that is obtained from the thermal decomposition of acetylene.

In another embodiment, the inner layer 12 of the layered tube 10 comprises from about 90 to about 100, preferably 92, parts by weight of ETFE, and from greater than 0 to about 10, preferably 8, parts by weight of the anti-static additive, each based on 100 parts by weight of the inner layer 12. The ETFE has a melt flow rate of 10 to 20 g/10 min according to ASTM-D3159 and a melting point of 225° C. according to DSC. The anti-static additive is carbon powder that is obtained from the thermal decomposition of acetylene.

In another embodiment, the inner layer 12 of the layered tube 10 comprises from about 90 to about 100, preferably 93.3, parts by weight of PFA, and from greater than 0 to about 10, preferably 6.7, parts by weight of the anti-static additive, each based on 100 parts by weight of the inner layer 12. The PFA has a melt flow rate of 12 g/10 min according to ASTM-D3159, a melting point of 310° C. according to DSC, and a tensile strength of 4,460 psi at 23° C. according to ASTM-D638. The anti-static additive is carbon powder that is obtained from the thermal decomposition of acetylene.

In another embodiment, the outer layer 14 of the layered tube 10 comprises from about 90 to 100, preferably 100, parts by weight ETFE based on 100 parts by weight of the outer layer 14. The ETFE has a melt flow rate of 10 to 20 g/10 min according to ASTM-D3159 and a melting point of 225° C. according to DSC.

In another embodiment, the outer layer 14 of the layered tube 10 comprises from about 50 to about 70, preferably 60, parts by weight of ETFE based on 100 parts by weight of the outer layer 14. The ETFE has a melt flow rate of 10 to 20 g/10 min according to ASTM-D3159 and a melting point of 225° C. according to DSC. The outer layer 14 also comprises from about 30 to about 50, preferably 40, parts by weight of TFE/P based on 100 parts by weight of the outer layer 14. The TFE/P has a storage modulus of 490 according to an RPA at 100° C. and 50 cpm, a fluorine content of 57 parts by weight based on 100 parts by weight of TFE/P, and a glass transition temperature of −3° C.

In another embodiment, the outer layer 14 of the layered tube 10 comprises from about 90 to 100, preferably 100, parts by weight of PFA based on 100 parts by weight of the outer layer 14. The PFA has a melt flow rate of 12 g/10 min according to ASTM-D3159, a melting point of 310° C. according to DSC, and a tensile strength of 4,460 psi at 23° C. according to ASTM-D638.

In another embodiment, the inner layer 12 of the layered tube 10 comprises from about 85 to 95, preferably 89, parts by weight of ETFE, and from about 5 to about 15, preferably 11 parts by weight of the anti-static additive, each based on 100 parts by weight of the inner layer 12. The ETFE has a melt flow rate of 10 to 20 g/10 min according to ASTM-D3159 and a melting point of 225° C. according to DSC. The anti-static additive is carbon powder that is obtained from the thermal decomposition of acetylene.

In another embodiment, the inner layer 12 of the layered tube 10 comprises from about 85 to about 95, preferably 89, parts by weight of ETFE, and from about 5 to about 15, preferably 11, parts by weight of the anti-static additive, each based on 100 parts by weight of the inner layer 12. The ETFE has a melt flow rate of 30 to 40 g/10 min according to ASTM-D3159 and a melting point of 225° C. according to DSC. The anti-static additive is carbon powder that is obtained from the thermal decomposition of acetylene.

In another embodiment, the inner layer 12 of the layered tube 10 comprises from about 85 to about 95, preferably 88, parts by weight of PFA, and from about 5 to about 15, preferably 12, parts by weight of the anti-static additive, each based on 100 parts by weight of the inner layer 12. The PFA has a melt flow rate of 12 g/10 min according to ASTM-D3159, a melting point of 310° C. according to DSC, and a tensile strength of 4,460 psi at 23° C. according to ASTM-D638. The anti-static additive is carbon powder that is obtained from the thermal decomposition of acetylene.

In another embodiment, the outer layer 14 of the layered tube 10 comprises from about 95 to about 100, preferably 100, parts by weight of ETFE based on 100 parts by weight of the outer layer 14. The ETFE has a melt flow rate of 10 to 20 g/10 min according to ASTM-D3159 and a melting point of 225° C. according to DSC.

In another embodiment, the outer layer 14 comprises from about 95 to about 100, preferably 100, parts by weight of ETFE based on 100 parts by weight of the outer layer 14. The ETFE has a melt flow rate of 30 to 40 g/10 min according to ASTM-D3159 and a melting point of 225° C. according to DSC.

In another embodiment, the outer layer 14 comprises from about 95 to about 100, preferably 100, parts by weight of ETFE based on 100 parts by weight of the outer layer 14. The ETFE has a melt flow rate of 12 g/10 min according to ASTM-D3159 and a melting point of 260° C. according to DSC.

In another embodiment, the outer layer 14 of the layered tube 10 comprises from about 90 to about 100, preferably 100, parts by weight of PFA. The PFA has a melt flow rate of 12 g/10 min according to ASTM-D3159, a melting point of 310° C. according to DSC, and a tensile strength of 4,460 psi at 23° C. according to ASTM-D638.

In another embodiment, the outer layer 14 of the layered tube 10 comprises from about 90 to about 100, preferably 100, parts by weight of PFA. The PFA has a melt flow rate of 5 g/10 min according to ASTM-D3159, a melting point of 310° C. according to DSC, and a tensile strength of 5,220 psi at 23° C. according to ASTM-D638.

In another embodiment, the outer layer 14 of the layered tube 10 comprises from about 85 to about 95, preferably 90, parts by weight of ETFE based on 100 parts by weight of the outer layer 14. The ETFE has a melt flow rate of 20 to 30 g/10 min according to ASTM-D3159 and a melting point of 225° C. according to DSC. The outer layer 14 also comprises from about 5 to about 15, preferably 10, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C.

In another embodiment, the outer layer 14 of the layered tube 10 comprises from about 75 to about 85, preferably 80, parts by weight of ETFE based on 100 parts by weight of the outer layer 14. The ETFE has a melt flow rate of 20 to 30 g/10 min according to ASTM-D3159 and a melting point of 225° C. according to DSC. The outer layer 14 also comprises from about 15 to about 25, preferably 20, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C.

In another embodiment, the outer layer 14 of the layered tube 10 comprises from about 55 to about 65, preferably 60, parts by weight of ETFE based on 100 parts by weight of the outer layer 14. The ETFE has a melt flow rate of 20 to 30 g/10 min according to ASTM-D3159 and a melting point of 225° C. according to DSC. The outer layer 14 also comprises from about 35 to about 45, preferably 40, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C.

In another embodiment, the outer layer 14 of the layered tube 10 comprises from about 50 to about 60, preferably 55, parts by weight of ETFE based on 100 parts by weight of the outer layer 14. The ETFE has a melt flow rate of 20 to 30 g/10 min according to ASTM-D3159 and a melting point of 225° C. according to DSC. The outer layer 14 also comprises from about 30 to about 40, preferably 35 parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C. The outer layer 14 also comprises from 5 to about 15, preferably 10, parts by weight of the potassium octatitanate fiber.

In another embodiment, the outer layer 14 of the layered tube 10 comprises from about 85 to about 95, preferably 90, parts by weight of ETFE based on 100 parts by weight of the outer layer 14. The ETFE has a melt flow rate of 12 g/10 min according to ASTM-D3159 and a melting point of 260° C. according to DSC. The outer layer 14 also comprises from about 5 to about 15, preferably 10, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C.

In another embodiment, the outer layer 14 of the layered tube 10 comprises from about 75 to about 85, preferably 80, parts by weight of ETFE based on 100 parts by weight of the outer layer 14. The ETFE has a melt flow rate of 12 g/10 min according to ASTM-D3159 and a melting point of 260° C. according to DSC. The outer layer 14 also comprises from about 15 to about 25, preferably 20, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C.

In another embodiment, the outer layer 14 of the layered tube 10 comprises from about 55 to about 65, preferably 60, parts by weight of ETFE based on 100 parts by weight of the outer layer 14. The ETFE has a melt flow rate of 12 g/10 min according to ASTM-D3159 and a melting point of 260° C. according to DSC. The outer layer 14 also comprises from about 35 to about 45, preferably 40, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C.

In another embodiment, the outer layer 14 of the layered tube 10 comprises from about 50 to about 60, preferably 55, parts by weight of ETFE based on 100 parts by weight of the outer layer 14. The ETFE has a melt flow rate of 12 g/10 min according to ASTM-D3159 and a melting point of 260° C. according to DSC. The outer layer 14 also comprises from about 30 to about 40, preferably 35 parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C. The outer layer 14 also comprises from 5 to about 15, preferably 10, parts by weight of the potassium octatitanate fiber.

In another embodiment, the inner layer 12 of the layered tube 10 comprises from about 90 to about 100, preferably 92, parts by weight of ETFE, and from greater than 0 to about 10, preferably 8, parts by weight of the anti-static additive, each based on 100 parts by weight of the inner layer 12. The ETFE has a melt flow rate of 20 to 30 g/10 min according to ASTM-D3159 and a melting point of 225° C. according to DSC. The anti-static additive is carbon powder that is obtained from the thermal decomposition of acetylene.

In another embodiment, the layered tube 10 comprises the inner layer 12. The inner layer 12 comprises the first fluoropolymer in an amount of from about 80 to about 99 parts by weight, and an anti-static additive in an amount of from about 1 to about 20 parts by weight, each based on 100 parts by weight of the inner layer 12. The layered tube 10 also comprises the outer layer 14. The outer layer 14 comprises the second fluoropolymer in an amount greater than 50 parts by weight based on 100 parts by weight of the outer layer 14. The outer layer 14 also comprises the crosslinker in an amount of from about 1 to about 10 parts by weight based on 100 parts by weight of the outer layer 14. Typically, both the first and second fluoropolymers comprise ETFE. The second fluoropolymer may also comprise the TFE/P. The second fluoropolymer may also consist essentially of the ETFE and the TFE/P. The outer layer 14 may also consist essentially of the second fluoropolymer and the crosslinker. In outer layer 14 may also comprise the reaction product of the second fluoropolymer and the crosslinker. The ETFE of the outer layer 14 may be is present in an amount of from about 55 to about 95 parts by weight based on 100 parts by weight of the outer layer 14, and the TFE/P may also be present in an amount of from about 5 to about 45 parts by weight based on 100 parts by weight of the outer layer 14. The crosslinker comprises the triallyl derivative of cyanuric acid.

In another embodiment, the outer layer 14 of the layered tube 10 comprises the reaction product of the second fluoropolymer and the crosslinker. In this embodiment, the second fluoropolymer comprises from about 50 to about 60, preferably 55, parts by weight of ETFE based on 100 parts by weight of the second mixture. The ETFE has a melt flow rate of 20 to 30 g/10 min according to ASTM-D3159 and a melting point of 225° C. according to DSC. The second fluoropolymer also comprises from about 35 to about 45, preferably 40, parts by weight of TFE/P, each based on 100 parts by weight of the second mixture. The TFE/P has a storage modulus of 490 according to an RPA at 100° C. and 50 cpm, a fluorine content of 57 parts by weight based on 100 parts by weight of the TFE/P, and a glass transition temperature of −3° C. The reaction product also comprises from about 2 to about 8, preferably 5, parts by weight TAIC based on 100 parts by weight of the outer layer 14. The reaction product is formed after the outer layer 14 is exposed to an electron beam.

In another embodiment, the outer layer 14 of the layered tube 10 comprises the reaction product of the second fluoropolymer and the crosslinker. In this embodiment, the second fluoropolymer comprises from about 60 to about 70, preferably 65, parts by weight of ETFE based on 100 parts by weight of the outer layer 14. The ETFE has a melt flow rate of 20 to 30 g/10 min according to ASTM-D3159 and a melting point of 225° C. according to DSC. The second fluoropolymer also comprises from about 25 to about 35, preferably 30, parts by weight of TFE/P, each based on 100 parts by weight of the outer layer 14. The TFE/P has a storage modulus of 490 according to an RPA at 100° C. and 50 cpm, a fluorine content of 57 parts by weight based on 100 parts by weight of the TFE/P, and a glass transition temperature of −3° C. The reaction product also comprises from about 2 to about 8, preferably 5, parts by weight TAIC based on 100 parts by weight of the outer layer 14. The reaction product is formed after the outer layer 14 is exposed to an electron beam.

In another embodiment, the outer layer 14 of the layered tube 10 comprises the reaction product of the second mixture. In this embodiment, the second mixture comprises from about 70 to about 80, preferably 75, parts by weight of ETFE based on 100 parts by weight of the second mixture. The ETFE has a melt flow rate of 20 to 30 g/10 min according to ASTM-D3159 and a melting point of 225° C. according to DSC. The second mixture also comprises from about 15 to about 25, preferably 20, parts by weight of TFE/P, each based on 100 parts by weight of the second mixture. The TFE/P has a storage modulus of 490 according to an RPA at 100° C. and 50 cpm, a fluorine content of 57 parts by weight based on 100 parts by weight of the TFE/P, and a glass transition temperature of −3° C. The second mixture also comprises from about 2 to about 8, preferably 5, parts by weight TAIC based on 100 parts by weight of the second mixture. The reaction product is formed after the outer layer 14 is exposed to an electron beam.

It is to be appreciated that it is expressly contemplated that any of the possible outer layers 14 described in the above embodiments may be used in combination with any of the possible inner layers 12 described in the above embodiments to form the layered tube 10 of this disclosure.

EXAMPLES

Various formulations of the inner and outer layers 12, 14 were extruded and evaluated individually and together (i.e., as the layered tube 10), for various physical properties including their ability to process. The various formulations set forth in the tables below are expressed in component weight percent based on total weight of the mixture used to form the respective layer. Tables 1 to 3 set forth formulations of the outer layer 14. Table 4 sets forth formulations of the inner layer 12.

TABLE 1

| Component | Formulation | | | | | | |
|---|---|---|---|---|---|---|---|
| | 1 | 2 | 3 | 4 | 5 | 6 | 7 |
| 1 | 100 | 60 | 0 | 0 | 0 | 0 | 0 |
| 2 | 0 | 0 | 0 | 0 | 0 | 0 | 90 |
| 3 | 0 | 0 | 0 | 0 | 100 | 0 | 0 |
| 4 | 0 | 0 | 0 | 0 | 0 | 100 | 0 |
| 5 | 0 | 40 | 0 | 0 | 0 | 0 | 10 |
| 6 | 0 | 0 | 100 | 0 | 0 | 0 | 0 |
| 7 | 0 | 0 | 0 | 100 | 0 | 0 | 0 |

TABLE 2

| Component | Formulation | | | | | | | | |
|---|---|---|---|---|---|---|---|---|---|
| | 8 | 9 | 10 | 11 | 12 | 13 | 14 | 15 | 16 |
| 1 | 0 | 0 | 0 | 0 | 0 | 0 | 0 | 0 | 0 |
| 2 | 80 | 60 | 0 | 0 | 0 | 0 | 55 | 100 | 0 |
| 3 | 0 | 0 | 0 | 0 | 0 | 0 | 0 | 0 | 0 |
| 4 | 0 | 0 | 90 | 80 | 60 | 55 | 0 | 0 | 100 |
| 5 | 20 | 40 | 10 | 20 | 40 | 35 | 35 | 0 | 0 |
| 6 | 0 | 0 | 0 | 0 | 0 | 0 | 0 | 0 | 0 |
| 7 | 0 | 0 | 0 | 0 | 0 | 0 | 0 | 0 | 0 |
| 8 | 0 | 0 | 0 | 0 | 0 | 10 | 10 | 0 | 0 |

TABLE 3

| Component | Formulation | | |
|---|---|---|---|
| | 17 | 18 | 19 |
| 2 | 55 | 65 | 75 |
| 5 | 40 | 30 | 20 |
| 10 | 5 | 5 | 5 |

TABLE 4

| Component | Formulation | | | | | | |
|---|---|---|---|---|---|---|---|
| | A | B | C | D | E | F | G |
| 1 | 92 | 0 | 0 | 89 | 0 | 91 | 0 |
| 2 | 0 | 0 | 0 | 0 | 0 | 0 | 92 |
| 3 | 0 | 0 | 0 | 0 | 89 | 0 | 0 |
| 6 | 0 | 93.3 | 88 | 0 | 0 | 0 | 0 |
| 9 | 8 | 6.7 | 12 | 11 | 11 | 9 | 8 |

Component 1 is EFTE having a melt flow rate of 10 to 20 g/10 min according to ASTM-D3159 and a melting point of 225° C. according to DSC.

Component 2 is EFTE having a melt flow rate of 20 to 30 g/10 min according to ASTM-D3159 and a melting point of 225° C. according to DSC.

Component 3 is EFTE having a melt flow rate of 30 to 40 g/10 min according to ASTM-D3159 and a melting point of 225° C. according to DSC.

Component 4 is EFTE having a melt flow rate of 12 g/10 min according to ASTM-D3159 and a melting point of 260° C. according to DSC.

Component 5 is TFE/P having a storage modulus of 490 according to an RPA at 100° C. and 50 cpm, a fluorine content of 57 parts by weight based on 100 parts by weight of the TFE/P, and a glass transition temperature of −3° C.

Component 6 is PFA having a melt flow rate of 12 g/10 min according to ASTM-D3159, a melting point of 310° C. according to DSC, and a tensile strength of 4,460 psi at 23° C. according to ASTM-D638.

Component 7 is PFA having a melt flow rate of 5 g/10 min according to ASTM-D3159, a melting point of 310° C. according to DSC, and a tensile strength of 5,220 psi at 23° C. according to ASTM-D638.

Component 8 is a potassium octatitanate fiber.

Component 9 is carbon powder that is obtained from the thermal decomposition of acetylene.

Component 10 is TAIC.

Table 5 illustrates the compression set data taken at 10 percent compression and 135° C. for the various formulations and a conventional outer layer.

Table 6 reports the tensile strength, percent elongation, apparent specific gravity, red dye weep, and lamination evaluation of various layered tube formulations.

Table 7 provides various layered tube formulations and Table 8 provides the longitudinal tensile strength, longitudinal elongations, traverse elongation, apparent specific gravity, red dye weep, and conductivity for the various layered tube formulations in Table 7.

TABLE 5

| Formulation | Force (N) |
|---|---|
| 15 | 344 |
| 7 | 219 |
| 8 | 169 |
| 9 | 54 |
| 16 | 327 |
| 10 | 248 |
| 11 | 181 |
| 12 | 67 |
| 13 | 72 |
| 14 | 125 |
| 2 | 57 |
| Conventional outer layer | 143 |

TABLE 6

| Layered tube | Inner layer | Outer layer | Tensile (psi) | Elongation (%) | Apparent Specific Gravity | Red Dye Weep | Lamination Evaluation | Conductivity (microamps) |
|---|---|---|---|---|---|---|---|---|
| 1 | F | 1 | 6105 | 285 | 1.7630 | (504 psi) 76+ | OK | 7520 |
| 2 | F | 1 | 6185 | 274 | 1.7643 | (515 psi) 76+ | OK | 7540 |
| 3 | F | 1 | 6451 | 278 | 1.7705 | (515 psi) 76+ | OK | 7710 |
| 4 | F | 1 | 5979 | 268 | 1.7639 | (515 psi) 76+ | OK | 7170 |
| 5 | F | 1 | 5252 | 240 | 1.7661 | (515 psi) 76+ | OK | 7030 |
| 6 | F | 1 | 5979 | 268 | 1.7617 | (515 psi) 76+ | OK | 6510 |
| 7 | A | 2 | 3948 | 274 | 1.6844 | (493 psi) Burst | OK | — |
| 8 | A | 2 | 4555 | 320 | 1.6784 | (482 psi) Burst | OK | — |
| 9 | A | 2 | 3894 | 268 | 1.6856 | (482 psi) Burst | OK | — |
| 10 | A | 2 | 4857 | 321 | 1.6864 | (504 psi) Burst | OK | 123 |
| 11 | A | 2 | 4279 | 299 | 1.6849 | (515 psi) Burst | OK | 123 |
| 12 | A | 2 | 4289 | 291 | 1.6833 | (504 psi) Burst | OK | 107 |
| 13 | B | 3 | 4258 | 314 | 2.1208 | (508 psi) 76+ | OK | — |
| 14 | B | 3 | 4193 | 308 | 2.1224 | (497 psi) 76+ | OK | — |
| 15 | B | 3 | 4000 | 297 | 2.1234 | (508 psi) 76+ | OK | — |
| 16 | B | 3 | 4329 | 317 | 2.1272 | (508 psi) 76+ | OK | — |
| 17 | B | 3 | 3402 | 251 | 2.1296 | (519 psi) 76+ | OK | — |
| 18 | B | 3 | 4065 | 302 | 2.1302 | (519 psi) 76+ | OK | — |

TABLE 7

| Layered Tube | Inner layer | Outer layer | Layered tube inner diameter |
|---|---|---|---|
| 19 | C | 4 | .498" +/− .003 |
| 20 | C | 3 | .258" +/− .003 |
| 21 | C | 4 | .258" +/− .004 |
| 22 | D | 1 | .258" +/− .005 |
| 23 | E | 5 | .258" +/− .006 |
| 24 | E | 6 | .258" +/− .007 |

TABLE 8

| Layered tube | Longitudinal Tensile (psi) | Longitudinal Elongation (%) | Transverse Tensile (psi) | Transverse Elongation (%) | Apparent Specific Gravity | Red Dye Weep | Conductivity (micro-amps) |
|---|---|---|---|---|---|---|---|
| 19 | 4301 | 274 | 4630 | 302 | 2.1202 | (304 psi) 78% | 7860 |
| 20 | 3838 | 217 | — | — | 2.1240 | (580 psi) 86% | 7870 |
| 21 | 3440 | 227 | — | — | 2.1220 | (550 psi) 83% | 7850 |
| 22 | 4000 | 148 | — | — | 1.7629 | (700 psi) 104% | 0 |
| 23 | 5752 | 291 | — | — | 1.7588 | (720 psi) 107% | 1000 |
| 24 | 6597 | 291 | — | — | 1.7428 | (639 psi) 99% | 4030 |

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described. The subject matter of all combinations of independent and dependent claims, both singly and multiply dependent, is herein expressly contemplated.

The invention claimed is:

1. A layered tube for a hose assembly, said layered tube comprising:
   A. an inner layer defining a chamber for directing a hydraulic fluid, said inner layer comprising;
      a first fluoropolymer in an amount of from about 80 to about 99 parts by weight based on 100 parts by weight of said inner layer, and
      an anti-static additive in an amount of from about 1 to about 20 parts by weight based on 100 parts by weight of said inner layer; and
   B. an outer layer melt bonded to said inner layer and comprising the reaction product of:
      a poly(ethylene-tetrafluoroethylene) in an amount of from about 60 to about 80 parts by weight based on 100 parts by weight of said outer layer, with said poly(ethylene-tetrafluoroethylene) having a melt point of from about 200 to about 260° C. according to differential scanning calorimetry (DSC), a melt flow rate of from about 10 to about 40 grams per ten minutes (g/10 min) according to ASTM-53159, and a flex modulus of from about 600 to about 900 MPa at 23° C. according to ASTM-D790,
      a poly(propylene-co-tetrafluoroethylene) in an amount of from about 5 to about 20 parts by weight based on 100 parts by weight of said outer layer, with said poly(propylene-co-tetrafluoroethylene) having a storage modulus of from about 80 to about 550 as measured with a Rubber Processing Analyzer (RPA) at 100° C. and 50 cpm, and
      a crosslinker in an amount of from about 1 to about 10 parts by weight based on 100 parts by weight of said outer layer;
   wherein said inner layer and said outer layer of said layered tube are collectively configured to withstand a fluid pressure of 5,000 psi.

2. The layered tube as set forth in claim 1 wherein said first fluoropolymer comprises a poly(ethylene-tetrafluoroethylene).

3. The layered tube as set forth in claim 2 wherein said crosslinker comprises a triallyl derivative of cyanuric acid.

4. The layered tube as set forth in claim 1 wherein said outer layer consists essentially of said reaction product.

5. The layered tube as set forth in claim 1 wherein said outer layer is subjected to radiation sufficient to produce a free radical.

6. The layered tube as set forth in claim 1 wherein said antistatic additive comprises carbon powder.

7. The layered tube as set forth in claim 1 wherein said outer layer further comprises a potassium octatitanate fiber.

8. The layered tube as set forth in claim 1 wherein said layered tube consists essentially of said inner layer and said outer layer.

9. A hose assembly comprising said layered tube as set forth in claim 1.

10. A layered tube for a hose assembly, said layered tube comprising:
    A. an inner layer defining a chamber for directing a hydraulic fluid, said inner layer comprising;
       a first fluoropolymer in an amount of from about 80 to about 99 parts by weight based on 100 parts by weight of said inner layer, and
       an anti-static additive in an amount of from about 1 to about 20 parts by weight based on 100 parts by weight of said inner layer; and
    B. an outer layer melt bonded to said inner layer and consisting essentially of the reaction product of:
       a poly(ethylene-tetrafluoroethylene) in an amount of from about 60 to about 80 parts by weight based on 100 parts by weight of said outer layer, with said poly(ethylene-tetrafluoroethylene) having a melt point of from about 200 to about 260° C. according to differential scanning calorimetry (DSC), a melt flow rate of from about 10 to about 40 grams per ten minutes (g/10 min) according to ASTM-53159, and a flex modulus of from about 600 to about 900 MPa at 23° C. according to ASTM-D790,
       a poly(propylene-co-tetrafluoroethylene) in an amount of from about 5 to about 20 parts by weight based on 100 parts by weight of said outer layer, with said poly(propylene-co-tetrafluoroethylene) having a storage modulus of 490 according to an RPA at 100° C. and 50 cpm, and a fluorine content of 57 parts by weight based on 100 parts by weight of poly(propylene-co-tetrafluoroethylene), and
       a crosslinker comprising a triallyl derivative of cyanuric acid in an amount of from about 1 to about 10 parts by weight based on 100 parts by weight of said outer layer;
    wherein said inner layer and said outer layer of said layered tube are collectively configured to withstand a fluid pressure of 5,000 psi.

11. A method for forming a layered tube, the layered tube having an outer layer melt bonded to an inner layer, said method comprising;
    forming a first mixture comprising from about 80 to about 99 parts by weight of a first fluoropolymer with from about 1 to about 20 parts by weight of an antistatic additive, each based on 100 parts by weight of the first mixture;
    forming a second mixture comprising,
       a poly(ethylene-tetrafluoroethylene) in an amount of from about 60 to about 80 parts by weight based on 100 parts by the mixture, with the poly(ethylene-tetrafluoroethylene) having a melt point of from about 200 to about 260° C. according to differential scanning calorimetry (DSC), a melt flow rate of from about 10 to about 40 grams per ten minutes (g/10 min) according to ASTM-53159, and a flex modulus of from about 600 to about 900 MPa at 23° C. according to ASTM-D790, a poly(propylene-co-tetrafluoroethylene) in an amount of from about 5 to about 20 parts by weight based on 100 parts by weight of the mixture, with the poly(propylene-co-tetrafluoroethylene) having a storage modulus of from about 80 to about 550 as measured with a Rubber Processing Analyzer (RPA) at 100° C. and 50 cpm, and a crosslinker in an amount of from about 1 to about 10 parts by weight based on 100 parts by weight of the mixture;

extruding the first mixture to produce the inner layer;

extruding the second mixture to produce the outer layer; and applying radiation to the outer layer to cure the outer layer;

wherein the inner layer and the outer layer of the layered tube are collectively configured to withstand a fluid pressure of 5,000 psi.

12. The method as set forth in 11 wherein the first mixture and the second mixture are co-extruded.

13. The method as set forth in claim 11 further comprising the step of compounding the first mixture before the step of extruding the first mixture.

14. The method as set forth in claim 11 further comprising the step of compounding the second mixture before the step of extruding the second mixture.

* * * * *